US012689031B2

(12) United States Patent
Yi

(10) Patent No.: US 12,689,031 B2
(45) Date of Patent: Jul. 21, 2026

(54) NEGATIVE ELECTRODE MATERIAL, ELECTROCHEMICAL APPARATUS, AND ELECTRONIC DEVICE

(71) Applicant: Ningde Amperex Technology Limited, Ningde City (CN)

(72) Inventor: Ting Yi, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 793 days.

(21) Appl. No.: 17/708,230

(22) Filed: Mar. 30, 2022

(65) Prior Publication Data

US 2022/0223852 A1    Jul. 14, 2022

Related U.S. Application Data

(63) Continuation of application No. PCT/CN2020/140341, filed on Dec. 28, 2020.

(51) Int. Cl.
H01M 4/38 (2006.01)
H01M 4/583 (2010.01)
(Continued)

(52) U.S. Cl.
CPC ........... H01M 4/386 (2013.01); H01M 4/583 (2013.01); H01M 4/623 (2013.01);
(Continued)

(58) Field of Classification Search
CPC ...... H01M 4/386; H01M 4/583; H01M 4/623; H01M 10/0569; H01M 2004/021;
(Continued)

(56) References Cited

U.S. PATENT DOCUMENTS

2008/0160409 A1*  7/2008  Ishida .................... B82Y 30/00
                                                   427/78
2010/0200208 A1*  8/2010  Cola ...................... B82Y 40/00
                                                   165/185
(Continued)

FOREIGN PATENT DOCUMENTS

| CN | 109119627 A | 1/2019 |
| CN | 111029543 A | 4/2020 |

(Continued)

OTHER PUBLICATIONS

Netafilm, "Mesh vs. Micron Comparison Chart" Accessed at https://www.fazeltafti.com/wp-content/uploads/2019/02/Mesh-vs-Micron.pdf (Year: 2024).*

(Continued)

*Primary Examiner* — Tong Guo
*Assistant Examiner* — Albert Michael Hilton
(74) *Attorney, Agent, or Firm* — Maier & Maier, PLLC

(57)    ABSTRACT

A negative electrode material includes a silicon-based material, or a silicon-based material and graphite. The silicon-based material includes a silicon oxide material and a carbon layer located on a surface of the silicon oxide material. A particle size distribution of the silicon-based material $1 \leq (D_n 99 - D_n 10)/D_n 50 \leq 4$, $D_n 10 \geq 1$ μm, and $D_{n50} \geq 3$ μm. In the negative electrode material, a number distribution of particle sizes of the silicon-based material can be controlled so that large and small particles are better matched, thereby improving cycling performance of an electrochemical apparatus.

16 Claims, 3 Drawing Sheets

10
11
12

(51) Int. Cl.
   *H01M 4/62*       (2006.01)
   *H01M 10/0569*    (2010.01)
   *H01M 4/02*       (2006.01)

(52) U.S. Cl.
   CPC .. *H01M 10/0569* (2013.01); *H01M 2004/021* (2013.01); *H01M 2004/027* (2013.01); *H01M 2300/0028* (2013.01); *H01M 2300/0051* (2013.01)

(58) Field of Classification Search
   CPC ... H01M 2004/027; H01M 2300/0028; H01M 230/051
   See application file for complete search history.

(56) References Cited

U.S. PATENT DOCUMENTS

| | | | |
|---|---|---|---|
| 2014/0154533 A1 | 6/2014 | Schaefer et al. | |
| 2018/0083308 A1* | 3/2018 | Ho .................... | H01M 10/0525 |
| 2019/0305375 A1* | 10/2019 | Uehara ............. | H01M 10/0569 |
| 2019/0393486 A1* | 12/2019 | He ...................... | H01M 4/1395 |
| 2020/0373564 A1* | 11/2020 | Yasuda ................ | H01M 4/625 |

FOREIGN PATENT DOCUMENTS

| | | |
|---|---|---|
| CN | 111146433 A | 5/2020 |
| CN | 111384374 A | 7/2020 |
| CN | 111602271 A | 8/2020 |
| EP | 2966037 A1 | 1/2016 |
| EP | 3104434 A1 * | 12/2016 ........ H01M 10/0525 |
| EP | 3187487 A1 * | 7/2017 .......... C07C 211/63 |
| JP | 2007294432 A | 11/2007 |
| JP | 5756781 B2 | 7/2015 |
| JP | 2015164139 A | 9/2015 |
| JP | 2015167145 A | 9/2015 |
| JP | 2018-163881 A | 10/2018 |
| KR | 20130101097 A * | 9/2013 |
| WO | 2014002356 A1 | 1/2014 |
| WO | WO-2019150511 A1 * | 8/2019 .......... H01M 10/052 |
| WO | 2018155609 A1 | 12/2019 |

OTHER PUBLICATIONS

Machine translation of KR20130101097 (Year: 2024).*
First Office Action for Chinese Patent application 202080006604.0 mailed Jan. 26, 2022.
Japanese Written Opinion for Application No. 2021-539132, dated Jul. 20, 2023, 4 pages.
Japanese Decision to Grant a Patent for Application No. 2021-539132, dated Oct. 3, 2023, 2 pages.
European Search Opinion and Supplemental Search Report for Application No. EP20937195, dated Aug. 19, 2022, 7 pages.

* cited by examiner

NEGATIVE ELECTRODE MATERIAL, ELECTROCHEMICAL APPARATUS, AND ELECTRONIC DEVICE

CROSS-REFERENCE TO RELATED APPLICATIONS

This application is a Continuation of PCT/CN2020/140341 filed on Dec. 28, 2020, the disclosure of which is hereby incorporated by reference in its entirety.

TECHNICAL FIELD

This application relates to the technical field of electrochemistry, and in particular, to a negative electrode material, an electrochemical apparatus, and an electronic device.

BACKGROUND

With the development and progress of electrochemical apparatuses (for example, lithium-ion batteries), increasing requirements have been placed on their cycling performance. Although the current technologies for improving electrochemical apparatuses can improve the cycling performance of the electrochemical apparatuses to some extent, they are not satisfactory, and further improvements are expected.

SUMMARY

An embodiment of this application provides a negative electrode material, including: a silicon-based material, or a silicon-based material and graphite. The silicon-based material includes a silicon oxide material and a carbon layer located on a surface of the silicon oxide material. A particle size distribution of the silicon-based material satisfies $1 \le (D_n99 - D_n10)/D_n50 \le 4$, $D_n10 \ge 1$ μm, and $D_{n50} \ge 3$ μm, where $Dn_{10}$, $Dn_{50}$, and $Dn_{99}$ are particle sizes when the cumulative number of particles calculated in ascending order of particle sizes reaches 10%, 50%, and 99% of the total number of particles, respectively, in a number distribution diagram of particle sizes of the silicon-based material.

In some embodiments, a mass of the silicon-based material accounts for 5% to 100% of a total mass of the silicon-based material and graphite.

In some embodiments, graphite includes at least one of natural graphite, artificial graphite, or meso-carbon microbeads.

In some embodiments, the silicon oxide material includes SiOx, where x satisfies $0.5 < x < 1.6$; and SiOx includes at least one of a crystal state or an amorphous state.

In some embodiments, in a Raman spectrum of the carbon layer, a ratio of a peak intensity at 1350 cm$^{-1}$ $I_{1350}$ to a peak intensity at 1580 cm$^{-1}$ $I_{1580}$ satisfies $1.0 < I_{1350}/I_{1580} < 2.5$. In some embodiments, the carbon layer is of a velvet structure, with a length of 20 nm to 50 nm.

Another embodiment of this application provides an electrochemical apparatus, including: a positive electrode plate, a negative electrode plate, and a separator disposed between the positive electrode plate and the negative electrode plate, where the negative electrode plate includes a negative electrode current collector and a negative electrode active substance layer disposed on the negative electrode current collector, where the negative electrode active substance layer includes the negative electrode material according to any one of the foregoing embodiments.

In some embodiments, the negative electrode active substance layer includes a binder, where the binder includes at least one of polyacrylate, polyimide, polyamide, polyamideimide, polyfluoroethylene, styrene butadiene rubber, sodium alginate, polyvinyl alcohol, polytetrafluoroethylene, polyacrylonitrile, sodium carboxymethyl cellulose, potassium carboxymethyl cellulose, sodium hydroxymethyl cellulose, or potassium hydroxymethyl cellulose.

In some embodiments, the electrochemical apparatus further includes an electrolyte, where the electrolyte includes an organic solvent and a lithium salt; the organic solvent includes at least one of fluoroethylene carbonate (FEC), ethylene carbonate (EC), propylene carbonate (PC), diethyl carbonate (DEC), ethyl methyl carbonate (EMC), dimethyl carbonate (DMC), polypropylene carbonate, or ethyl propionate; and optionally, the organic solvent includes FEC, where a mass percentage of the FEC in the electrolyte is 3% to 25%.

An embodiment of this application further provides an electronic apparatus, including the electrochemical apparatus according to any one of the foregoing embodiments.

The negative electrode material provided m the embodiments of this application includes a silicon-based material, or a silicon-based material and graphite. The silicon-based material includes a silicon oxide material and a carbon layer located on a surface of the silicon oxide material. A particle size distribution of the silicon-based material satisfies $1 \le (D_n99 - D_n10)/D_n50 \le 4$, $D_n10 \ge 1$ μm, and $D_{n50} \ge 3$ μm. In the negative electrode material provided in the embodiments of this application, a number distribution of particle sizes of the silicon-based material can be controlled so that large and small particles are better matched, thereby improving cycling performance of an electrochemical apparatus.

BRIEF DESCRIPTION OF DRAWINGS

With reference to the accompanying drawings and the Detailed Description below, the above and other features, advantages, and aspects of the embodiments of this application will become more apparent. Throughout the drawings, the same or similar reference numbers indicate same or similar elements. It should be understood that the drawings are exemplary and that the components and elements are not necessarily drawn to scale.

DETAILED DESCRIPTION

Figure 1:
FIG. 1 is a schematic diagram of an electrochemical apparatus according to an embodiment of this application.

Embodiments of this application will be described in more detail below with reference to the accompanying drawings. Although some embodiments of this application are illustrated in the accompanying drawings, it should be understood that this application may be implemented in various forms and should not be construed as being limited to the embodiments set forth herein. Rather, these embodiments are provided for a more thorough and complete understanding of this application. It should be understood that the accompanying drawings and embodiments of this application are for illustrative purposes only, and are not intended to limit the scope of protection of this application.

Silicon-based materials has much a higher specific capacity than carbon materials. Therefore, more and more electrochemical apparatuses are using silicon-based materials as their negative electrode materials. However, Silicon-based materials as negative electrode materials are still subject to certain defects. During cycling, a significant volume change of the silicon-based material causes the silicon-based material to be pulverized and separated from a negative electrode current collector, thereby degrading cycling performance of the electrochemical apparatus.

An embodiment of this application provides a negative electrode material. The negative electrode material includes a silicon-based material, or includes a silicon-based material and graphite. The negative electrode material includes the silicon-based material, thereby helping increase a specific capacity of the negative electrode material. The silicon-based material includes a silicon oxide material and a carbon layer located on a surface of the silicon oxide material. The carbon layer on at least part of the surface of the silicon oxide material can increase conductivity of the silicon-based material and reduce swelling of the silicon-based material during cycling.

A particle size distribution of the silicon-based material satisfies $1 \leq (D_n99 - D_n10)/D_n50 \leq 4$, $D_n10 \geq 1$ $\mu$m, and $D_{n50} \geq 3$ $\mu$m. $Dn_{10}$, $Dn_{50}$ and $Dn99$ are particle sizes when the cumulative number of particles calculated in ascending order of particle sizes reaches 10%, 50%, and 99% of the total number of particles, respectively, in a number distribution diagram of particle sizes of the silicon-based material. In some embodiments, in a number distribution diagram of particle sizes of the silicon-based material, integral areas are calculated in ascending order of particle sizes, and the integral areas that are 10%, 50% and 99% of the total area correspond to particle sizes $Dn_{10}$, $Dn_{50}$ and $Dn_{99}$, respectively.

In some embodiments, when particles of the silicon-based material satisfy $Dn_{10} < 1$ $\mu$m or $Dn_{50} < 3$ $\mu$m, due to the excessively small particle size and excessively large surface area of the silicon-based material, too much electrolyte is consumed to form an SEI (solid electrolyte interphase) film, which causes more side reactions, more byproducts generated, and more gas produced by an electrochemical apparatus during cycling. In addition, a continuous increase in the SEI film degrades cycling performance of the electrochemical apparatus. In some embodiments, when $(Dn_{99} - Dn_{10})/Dn_{50} < 1$, the silicon-based material has a small range of particle size distribution, which may be inconducive to filling voids of the silicon-based material, thereby resulting m an inadequate compacted density; and when $(Dn_{99} - Dn_{10})/Dn_{50} > 4$, more gas may be produced by an electrochemical apparatus during cycling. In this embodiment of this application, particle sizes of the silicon-based material can be controlled so that a number distribution of the particle sizes of the silicon-based material satisfies $1 \leq (D_n99 - D_n10)/D_n50 \leq 4$, $D_n10 \geq 1$ $\mu$m, and $D_{n50} \geq 3$ $\mu$m. In this way, a compacted density of a negative electrode can be increased, and side reactions of an electrochemical apparatus during cycling can be decreased, thereby increasing an energy density, improving the cycling performance of the electrochemical apparatus and reducing production of gas during cycling.

In some embodiments, a mass of the silicon-based material accounts for 5% to 100% of a total mass of the silicon-based material and the graphite. When a ratio of the mass of the silicon-based material to the total mass of the silicon-based material and the graphite is less than 5%, an energy density may be increased insignificantly due to a too low percentage of the silicon-based material. In some embodiments, the graphite includes at least one of natural graphite, artificial graphite, or meso-carbon microbeads.

In some embodiments, the silicon oxide material includes SiOx, where x satisfies $0.5 < x < 1.6$; and SiOx includes at least one of a crystal state or an amorphous state. In some embodiments, when x is too large, SiOx generates more $Li_2O$ and $Li_4SiO_4$ of irreversible phases during cycling, resulting in decreased specific energy and first-cycle coulombic efficiency; when x is too small, cycling performance of SiOx may be degraded.

In some embodiments, in a Raman spectrum of the carbon layer, a ratio of a peak intensity at 1350 $cm^{-1}$ $I_{1350}$ to a peak intensity at 1580 $cm^{-1}$ $I_{1580}$ satisfies $1.0 < I_{1350}/I_{1580} < 2.5$. In some embodiments, $I_{1350}/I_{1580}$ of the carbon layer reflects a defect density in the carbon layer. The defect density is proportional to $I_{1350}/I_{1580}$. When $I_{1350}/I_{1580}$ is too small, conduction of electrons is affected, and direct current impedance of an electrochemical apparatus may be increased. When $I_{1350}/I_{1580}$ is too large, inhibition of swelling of a silicon oxide material by the carbon layer may be less effective, and increased defects may cause more side reactions with an electrolyte.

In some embodiments, the carbon layer is a velvet structure with a length of 20 nm to 50 nm. In some embodiments, a transmission electron microscopy image may be taken for the carbon layer, and a length of the velvet structure may be calculated from the transmission electron microscopy image. The carbon layer of a velvet structure has a long-range conduction effect, which is conducive to electrical contact during cycling, thereby helping increase a cycling capacity retention rate.

An embodiment of this application further provides an electrochemical apparatus. As shown in FIG. 1, the electrochemical apparatus includes: a positive electrode plate 10, a negative electrode plate 12, and a separator 11 disposed between the positive electrode plate 10 and the negative electrode plate 12, where the negative electrode plate 12 includes a negative electrode current collector and a negative electrode active substance layer disposed on the negative electrode current collector, and the negative electrode active substance layer includes the negative electrode material described in any one of the above embodiments.

In some embodiments, the negative electrode active substance layer includes a binder, where the binder includes at least one of polyacrylate, polyimide, polyamide, polyamideimide, polyfluoroethylene, styrene butadiene rubber, sodium alginate, polyvinyl alcohol, polytetrafluoroethylene, polyacrylonitrile, sodium carboxymethyl cellulose, potassium carboxymethyl cellulose, sodium hydroxymethyl cellulose, or potassium hydroxymethyl cellulose.

In some embodiments of this application, the electrochemical apparatus further includes an electrolyte; the electrolyte includes an organic solvent and a lithium salt; and the organic solvent includes at least one of fluoroethylene carbonate (FEC), ethylene carbonate (EC), propylene carbonate (PC), diethyl carbonate (DEC), ethyl methyl carbonate (EMC), dimethyl carbonate (DMC), polypropylene carbonate, or ethyl propionate.

In some embodiments of this application, the organic solvent includes FEC, and a mass percentage of FEC in the electrolyte is 3% to 25%. In some embodiments, FEC can improve mechanical properties of an SEI film, thereby reducing a cycling swelling rate and increasing a cycling capacity retention rate of the electrochemical apparatus. With an excessively small amount of FEC, improvement may be limited. With an excessively large amount of FEC, the SEI film may be continuously formed, thereby increasing an impedance of the electrochemical apparatus and resulting in a decreased cycling capacity retention rate. In some embodiments, addition of FEC having a mass percentage of 3% to 25% can significantly increase the cycling capacity retention rate and reduce the cycling swelling rate of the electrochemical apparatus using a silicon-based material.

In some embodiments of this application, the lithium salt includes: at least one of lithium hexafluorophosphate (LiPF$_6$), lithium tetrafluoroborate (LiBF$_4$), lithium difluorophosphate (LiPO$_2$F$_2$), lithium bis(trifluoromethanesulfonimide) LiN(CF$_3$SO$_2$)$_2$(LiTFSI), Lithium bis(fluorosulfonyl)imide Li(N(SO$_2$F)$_2$)(LiFSI), lithium bis(oxalate)borate LiB(C$_2$O$_4$)$_2$(LiBOB), or lithium difluoro(oxalato)borate LiBF$_2$(C$_2$O$_4$)(LiDFOB).

In some embodiments, the negative electrode active substance layer may further include a conductive agent. The conductive agent in the negative electrode active substance layer may include at least one of carbon black, acetylene black, Ketjen black, lamellar graphite, graphene, carbon nanotubes, carbon fibers, or carbon nanowires. It should be understood that the materials disclosed here are merely examples, and any other suitable material may be adopted for the negative electrode active material layer. In some embodiments, a mass ratio of the negative electrode material, conductive agent, and binder in the negative electrode active substance layer may be (80 to 99):(0.5 to 10):(0.5 to 10). It should be understood that this is merely an example and not intended to limit this application.

In some embodiments, the positive electrode plate 10 includes a positive electrode current collector and a positive electrode active substance layer disposed on the positive electrode current collector. The positive electrode active substance layer may be located on one or two sides of the positive electrode current collector. In some embodiments, the positive electrode current collector may be made of an aluminum foil. Certainly, other positive electrode current collectors commonly used in the prior art may also be used. In some embodiments, a thickness of the positive electrode current collector may be 1 μm to 200 μm. In some embodiments, the positive electrode active substance layer may be applied on part of the positive electrode current collector. In some embodiments, a thickness of the positive electrode active substance layer may be 10 μm to 500 μm. It should be understood that this is merely an example, and any other suitable thickness may be adopted.

In some embodiments, the positive electrode active substance layer includes a positive electrode material. In some embodiments, the positive electrode material may include at least one of lithium cobaltate, lithium manganate, lithium iron phosphate, lithium iron manganese phosphate, lithium nickel cobalt manganate, lithium nickel cobalt aluminate, or lithium nickel manganate, and the positive electrode material may undergo doping and/or coating processing. In some embodiments, the positive electrode active substance layer further includes a binder and a conductive agent. In some embodiments, the binder in the positive electrode active substance layer may include at least one of polyvinylidene fluoride, a vinylidene fluoride-hexafluoropropylene copolymer, a styrene-acrylate copolymer, a styrene-butadiene copolymer, polyamide, polyacrylonitrile, a polyacrylic ester, polyacrylic acid, a polyacrylic salt, carboxyl methyl cellulose, polyvinyl acetate, polyvinylpyrrolidone, polyvinylether, polymethyl methacrylate, polytetrafluoroethylene, or polyhexafluoropropylene. In some embodiments, the conductive agent in the positive electrode active substance layer may include at least one of conductive carbon black, acetylene black, Ketjen black, lamellar graphite, graphene, carbon nanotubes, or carbon fibers. In some embodiments, a mass ratio of the positive electrode material, conductive agent, and binder in the positive electrode active substance layer may be (70 to 98):(1 to 15):(1 to 15). It should be understood that the descriptions above are merely examples, and any other suitable materials, thicknesses, and mass ratios may be adopted for the positive electrode active substance layer.

In some embodiments, the separator 11 includes at least one of polyethylene, polypropylene, polyvinylidene fluoride, polyethylene terephthalate, polyimide, or aramid. For example, polyethylene includes at least one selected from high-density polyethylene, low-density polyethylene, or ultra-high molecular weight polyethylene. In particular, polyethylene and polypropylene can well prevent short circuit, and can enhance stability of a battery through a turn-off effect. In some embodiments, a thickness of the separator is in a range from about 3 μm to 500 μm.

In some embodiments, a surface of the separator may further include a porous layer. The porous layer is disposed on at least one surface of the separator and includes at least one of inorganic particles or a binder. The inorganic particles are selected from at least one of aluminum oxide (Al$_2$O$_3$), silicon oxide (SiO$_2$), magnesium oxide (MgO), titanium oxide (TiO$_2$), hafnium dioxide (HfO$_2$), tin oxide (SnO$_2$), cerium dioxide (CeO$_2$), nickel oxide (NiO), zinc oxide (ZnO), calcium oxide (CaO), zirconium oxide (ZrO$_2$), yttrium oxide (Y$_2$O$_3$), silicon carbide (SiC), boehmite, aluminum hydroxide, magnesium hydroxide, calcium hydroxide, or barium sulfate. In some embodiments, pores of the separator have a diameter of about 0.01 μm to 1 μm. The binder in the porous layer is selected from at least one of polyvinylidene fluoride, vinylidene fluoride-hexafluoropropylene copolymer, polyamide, polyacrylonitrile, polyacrylic ester, polyacrylic acid, polyacrylic salt, carboxyl methyl cellulose, polyvinylpyrrolidone, polyvinyl ether, polymethyl methacrylate, polytetrafluoroethylene, or polyhexafluoropropylene. The porous layer on the surface of the separator can improve heat resistance, oxidation resistance, and electrolyte infiltration performance of the separator, enhancing binding between the separator and an electrode plate.

In some embodiments of this application, an electrode assembly of the electrochemical apparatus is a wound electrode assembly or a stacked electrode assembly. In some embodiments, the electrochemical apparatus is a lithium-ion battery, but this application is not limited thereto.

In some embodiments of this application, taking a lithium-ion battery as an example, a positive electrode plate, a separator, and a negative electrode plate are wound or stacked in sequence to form an electrode assembly which is then loaded into, for example, an aluminum-plastic filmed housing for packaging, an electrolyte is injected, and the lithium-ion battery is obtained after formation and packaging. Then, performance testing is performed on the prepared lithium-ion battery.

Those skilled in the art will understand that a preparation method of the electrochemical apparatus (for example, a lithium-ion battery) described above is merely an example. Without departing from the content disclosed in this application, other methods commonly used in the art may be adopted.

An embodiment of this application further provides an electronic apparatus including the electrochemical apparatus described above. The electronic apparatus according to this embodiment of this application is not particularly limited, and may be any known electronic apparatus used in the prior art. In some embodiments, the electrochemical apparatus may include, but is not limited to, a notebook computer, a pen-input computer, a mobile computer, an electronic book player, a portable telephone, a portable fax machine, a portable copier, a portable printer, a stereo headset, a video recorder, a liquid crystal television, a portable cleaner, a portable CD player, a mini-disc, a transceiver, an electronic notebook, a calculator, a memory card, a portable recorder, a radio, a standby power source, a motor, an automobile, a motorcycle, a motor bicycle, a bicycle, a lighting appliance, a toy, a game console, a clock, an electric tool, a flash lamp, a camera, a large household battery, a lithium-ion capacitor, or the like.

Some embodiments of this application further provide a preparation method of an electrochemical apparatus, including the following steps.

Preparation of a Negative Electrode Material

Step 1: 500 g of amorphous silicon monoxide powder having a particle size of 1 mm to 100 mm and a chemical formula of SiOx ($0.5 \geq x \geq 1.6$) is first mechanically crushed and then jet pulverized with a jet pulverizer, and then grading is performed to obtain silicon monoxide powder with a particle size of 0.2 μm to 30 μm.

Step 2: The silicon monoxide powder obtained in step 1 is placed into a CVD (chemical vapor deposition, Chemical Vapor Deposition) furnace that is then heated to 900° C. to 1000° C. and filled with a carbon source gas at a flow rate of 300 mL/min, and the carbon source gas is cut off immediately after 60 minutes. The power is cooled down to room temperature in an inert atmosphere, and a cooled powder sample is taken out. The inert atmosphere is a gas mixture of one or more of Ar, $N_2$, and He; and the carbon source gas is a gas mixture of one or more of $CH_4$, $C_2H_4$, $C_7H_8$, $C_2H_2$, and $C_2H_2$.

Step 3: A product obtained in step 2 is subjected to demagnetization and powder grading to obtain a carbon-coated silicon monoxide negative electrode material satisfying $1 \leq (D_n99 - D_n10)/D_n50 \leq 4$, $D_n10 \geq 1$ μm, and $D_{n50} \geq 3$ μm.

Preparation of a Negative Electrode Plate

Powder of the prepared negative electrode material, graphite, a conductive agent, and a binder are taken to prepare a negative electrode plate for lithium-ion battery. The conductive agent includes one or more of conductive carbon black, acetylene black, Ketjen black, lamellar graphite, graphene, and the like, and graphite includes at least one of natural graphite, artificial graphite, or meso-carbon microbeads. Specific steps are as follows.

400 g of negative electrode material powder, 2400 g of graphite, and 35 g of conductive agent are added into an MSK-SFM-10 vacuum stirrer, and stirred for 40 min at a revolution speed of 10 r/min to 30 r/min.

95 g of binder is added into the stirred mixture, stirring is performed for 60 min for uniform dispersion, 120 g of deionized water is then added, and stirring is performed for uniform dispersion to obtain a mixed slurry, with a revolution speed of 10 r/min to 30 r/min and a rotation speed of 1000 r/min to 1500 r/min. A slurry viscosity is controlled between 1500 mPa·s and 4000 mPa·s, and a solid content is controlled between 35% and 50%.

The slurry is filtered with a 170-mesh double-layer screen to obtain a negative electrode slurry, the negative electrode slurry is then applied on a copper foil with a coating thickness of 50 μm to 200 μm; and the electrode plate is dried and cold pressed to a double-sided compacted density of 1.5 g/cm³ to 2.0 g/cm³.

Preparation of a Positive Electrode Plate

A positive electrode material $LiCoO_2$, conductive carbon black, and polyvinylidene fluoride (PVDF) are fully stirred and uniformly mixed in an N-methylpyrrolidone solvent at a mass ratio of 96.7:1.7:1.6, and a resulting mixture is applied on an Al foil, followed by drying and cold pressing, to obtain a positive electrode plate.

Preparation of a Lithium-Ion Battery

With a polyethylene porous polymeric film as a separator, the positive electrode plate, the separator, and the negative electrode plate are stacked in sequence, so that the separator is placed between the positive and negative electrode plates for isolation, and the stack is wound to obtain a bare cell. The bare cell is placed in an outer package, an electrode (a volume ratio of ethylene carbonate EC, dimethyl carbonate DMC, and diethyl carbonate DEC in the electrolyte is 1:1:1, a mass percentage of FEC is 10%, and a concentration of $LiPF_6$ is 1 mol/L) is injected, sealing is performed, and an electrochemical apparatus is obtained after processes of formation, degassing, and trimming.

To better illustrate the technical solutions of this application, some specific examples are listed below to better illustrate this application. Herein, a lithium-ion battery is used as an example.

Example 1

Preparation of a Negative Electrode Material

Step (1): 500 g of amorphous silicon monoxide powder having a particle size of 1 mm to 100 mm and a chemical formula of SiOx ($0.5 \geq x \geq 1.6$) was mechanically crushed first, and then jet-pulverized by using a jet pulverizer to obtain silicon monoxide powder having a particle size of 0.2 μm to 30 μm, and grading was performed to obtain SiOx satisfying $D_n10 \leq 1$ μm.

Step (2): SiOx obtained in step (1) was placed into a CVD furnace that was then heated to 960° C. and filled with methane at a gas flow of 300 mL/min, and the methane gas was cut off immediately after 120 min. Cooling to room temperature was performed in an inert atmosphere, and a carbon-coated silicon oxide material was taken out after cooling.

Step (3): The carbon-coated silicon oxide material obtained in step (2) was subjected to demagnetization, grading, and 1300-mesh screening to obtain a carbon-coated silicon monoxide negative electrode material.

Preparation of a Negative Electrode Plate 400 g of negative electrode material, 2400 g of graphite, and 35 g of conductive agent were added into an MSK-SFM-10 vacuum stirrer, and stirred for 120 min at a revolution speed of 10 r/min to 30 r/min.

112 g of binder was added into the stirred mixture, stirring was performed for 60 min for uniform dispersion, 120 g of deionized water was then added, and stirring was performed for uniform dispersion to obtain a mixed slurry. During stirring, a revolution speed was 10 r/min to 30 r/min, and a rotation speed was 1000 r/min to 1500 r/min; after stirring, a viscosity of the mixed slurry was controlled between 2500 mPa·s and 4000 mPa·s, and a solid content of the mixed slurry was controlled at 35% to 50%.

The mixed slurry was filtered with a 170-mesh double-layer screen to obtain a negative electrode slurry which was then applied on a copper foil at a coating thickness of 80 μm; and the electrode plate was dried and cold pressed to a double-sided compacted density of 1.76 g/cm$^3$.

Preparation of a Positive Electrode Plate

A positive electrode material $LiCoO_2$, conductive carbon black, and polyvinylidene fluoride (PVDF) were fully stirred and uniformly mixed in an N-methylpyrrolidone solvent at a mass ratio of 96.7:1.7:1.6, and a resulting mixture was applied on an Al foil, followed by drying and cold pressing, to obtain a positive electrode plate.

Preparation of a Lithium-Ion Battery

A porous polyethylene polymeric film was used as a separator. The positive electrode plate, the separator, and the negative electrode plate were stacked in sequence, so that the separator was placed between the positive and negative electrode plates for isolation, and the stack was wound to obtain a bare cell. The bare cell was placed in an outer package, an electrode (a volume ratio of ethylene carbonate EC, dimethyl carbonate DMC, and diethyl carbonate DEC in the electrolyte was 1:1:1, a mass percentage of FEC was 10%, and a concentration of $LiPF_6$ was 1 mol/L) was injected, sealing was performed, and a lithium-ion battery was obtained after processes of formation, degassing, and trimming.

Example 2

Example 2 is the same as Example 1, except that a 1200-mesh screen was used for screening in step (3) of preparation of a negative electrode material.

Example 3

Example 3 is the same as Example 1, except that a 1000-mesh screen was used for screening in step (3) of preparation of a negative electrode material.

Example 4

Example 4 is the same as Example 1, except that an 800-mesh screen was used for screening in step (3) of preparation of a negative electrode material.

Example 5

Example 5 is the same as Example 1, except that a 650-mesh screen was used for screening in step (3) of preparation of a negative electrode material.

Example 6

Example 6 is the same as Example 5, except that SiOx obtained in step (1) was placed in a CVD furnace that was then heated to 1000° C. in step (2) of preparation of a negative electrode material.

Example 7

Example 7 is the same as Example 5, except that SiOx obtained in step (1) was placed in a CVD furnace that was then heated to 900° C. in step (2) of preparation of a negative electrode material.

Example 8

Example 8 is the same as Example 1, except that the preparation of the negative electrode material was different.

Preparation of a negative electrode material in Example 8:

Step (1): 500 g of powder of amorphous silicon monoxide having a particle size of 1 mm to 100 mm and a chemical formula of SiOx (0.5≥x≥1.6) was mechanically crushed first, and then jet-pulverized by using a jet pulverizer to obtain silicon monoxide powder having a particle size of 0.2 μm to 30 μm, and grading was performed to obtain silicon oxide particles SiOx satisfying $D_n10≤1$ μm.

Step (2): The silicon oxide particles removed in the grading process in step (1) were screened with a 13000-mesh screen to obtain silicon oxide particles having a particle size≤1 μm.

Step (3): The silicon oxide particles obtained in step (1) and step (2) were mixed at a mass ratio of 1:1, the mixed particles were placed into a CVD furnace that was then heated to 960° C. and filled with methane at a gas flow of 300 mL/min, and the methane gas was cut off immediately after 120 minutes. Cooling to room temperature was performed in an inert atmosphere Ar, and a powder sample was taken out after cooling.

Step (4): The carbon-coated silicon oxide material obtained in step (3) was subjected to demagnetization, grading, and 650-mesh screening to obtain a carbon-coated silicon monoxide negative electrode material.

Example 9

Example 9 is the same as Example 5, except that SiOx obtained in step (1) was placed in a CVD furnace that was then heated to 800° C. in step (2) of preparation of a negative electrode material.

Example 10

Example 10 is the same as Example 5, except that SiOx obtained in step (1) was placed in a CVD furnace that was then heated to 1100° C. in step (2) of preparation of a negative electrode material.

Example 11

Example 11 is the same as Example 5, except that a 400-mesh screen was used for screening in step (3) of preparation of a negative electrode material.

Example 12

Example 12 is the same as Example 5, except that instead of methane, acetylene was introduced in step (2) of preparation of a negative electrode material.

Example 13

Example 13 is the same as Example 5, except that an electrolyte used in Example 13 contained no FEC.

Example 14

Example 14 is the same as Example 5, except that FEC contained in an electrolyte used in Example 14 had a mass percentage of 30%.

The following describes testing methods for various parameters of this application.

SEM (scanning electron microscopy) test: Scanning electron microscope characterization was recorded with a PhilipsXL-30 field emission scanning electron microscope. Testing was performed under the conditions of 10 kV and 10 mA.

TEM (transmission electron microscopy) test: Transmission electron microscope characterization was tested on a JEOL JEM-2010 transmission electron microscope, under a working voltage of 200 kV.

Powder compacted density test: SUNS UTM7305 was used to add 1 g of powder into a 13 mm mold, pressure was Cycle swelling rate test for a lithium-ion battery: A spiral micrometer was used to measure a thickness d0 of the lithium-ion battery at initial 50% SOC. At the 400th cycle, the lithium-ion battery was in a 100% SOC state, and then a thickness d1 of the lithium-ion battery at that time was measured with the spiral micrometer.

$$\text{Swelling rate after 400 cycles at } 45^\circ\text{ C.} = (d1-d0)/d0 \times 100\%.$$

Parameters and performance test results of the examples are shown in Table 1.

TABLE 1

| Example | Particle size of silicon-based material | | | | Compacted density of | | |
| | $Dn_{10}$ µm | $Dn_{50}$ µm | $Dn_{99}$ µm | $(Dn_{99} - Dn_{100})/Dn_{50}$ | negative electrode material powder at 3t (g/cm³) | Capacity retention rate after 400 cycles at 45° C. (%) | Swelling rate after 400 cycles at 45° C. (%) |
|---|---|---|---|---|---|---|---|
| Example 1 | 1.9 | 3.1 | 6.2 | 1.39 | 1.38 | 86.5% | 10.8% |
| Example 2 | 1.9 | 3.3 | 7.1 | 1.58 | 1.41 | 87.3% | 9.8% |
| Example 3 | 2.0 | 3.4 | 7.8 | 1.71 | 1.44 | 87.9% | 9.3% |
| Example 4 | 2.1 | 4.0 | 9.2 | 1.78 | 1.46 | 88.2% | 8.9% |
| Example 5 | 2.0 | 4.8 | 11.7 | 2.02 | 1.51 | 92.7% | 8.0% |
| Example 6 | 3.0 | 5.1 | 12.3 | 1.82 | 1.48 | 90.0% | 8.7% |
| Example 7 | 1.8 | 4.5 | 10.4 | 1.92 | 1.49 | 90.5% | 8.5% |
| Example 8 | 0.457 | 0.656 | 5.12 | 7.11 | 1.21 | 80.2% | 14.5% |
| Example 9 | 1.5 | 2.9 | 9.8 | 3.32 | 1.32 | 84.3% | 12.1% |
| Example 10 | 4.0 | 6.2 | 30.8 | 4.32 | 1.29 | 81.2% | 12.9% |
| Example 11 | 2.0 | 3.9 | 22.0 | 5.12 | 1.25 | 83.0% | 13.5% |
| Example 12 | 2.1 | 5.0 | 11.8 | 1.94 | 1.42 | 75% | 10.4% |
| Example 13 | 2.0 | 4.8 | 11.7 | 2.02 | 1.51 | 60% | 15% |
| Example 14 | 2.0 | 4.8 | 11.7 | 2.02 | 1.51 | 83% | 9.4% | raised at a rate of 10 mm/min, and the pressure was relieved at a rate of 30 mm/min after the pressure reached 5 tons. When the pressure reached 3 tons, the pressure was maintained for 10 s, volume of the powder was measured, and a powder compacted density PD measured in g/cm³ was obtained based on a mass to volume ratio.

Particle size test: About 0.02 g of a powder sample was added into a 50 ml clean beaker, about 20 ml of deionized water was added, a few drops of a 1% surfactant were dropwise added to make the powder fully dispersed in the water, the powder was subjected to ultrasound for 5 min in a 120 W ultrasonic cleaning machine, and a particle size distribution was tested with a MasterSizer 2000.

Particle size test method for a silicon-based material in an electrode plate: The electrode plate was soaked and cleaned with DMC (dimethyl carbonate) and then dried in a vacuum oven at 40° C. for 12 hours, a sample was taken for SEM test, and pictures of five points in a 200 µm×200 µm range were selected for counting particle sizes of the silicon-based material.

$$\text{Particle diameter } R = (\text{longest diameter } R1 + \text{shortest diameter } R2)/2.$$

Lithium-ion battery cycling test: At 45° C., the battery was charged at a constant current of 0.7 C to 4.45 V, then charged at a constant voltage to 0.025 C, left standing for 5 min, and then discharged at 0.5 C to 3.0 V. A capacity obtained in this cycle was an initial capacity C0. Then, a 0.7 C charge/0.5 C discharge cycling test was performed. A ratio of a capacity of each cycle to the initial capacity was calculated to obtain a capacity attenuation curve, and a capacity C1 after 400 cycles was recorded.

$$\text{Capacity retention rate after 400 cycles at } 45^\circ\text{ C.} = C1/C0 \times 100\%.$$

Figure 2:
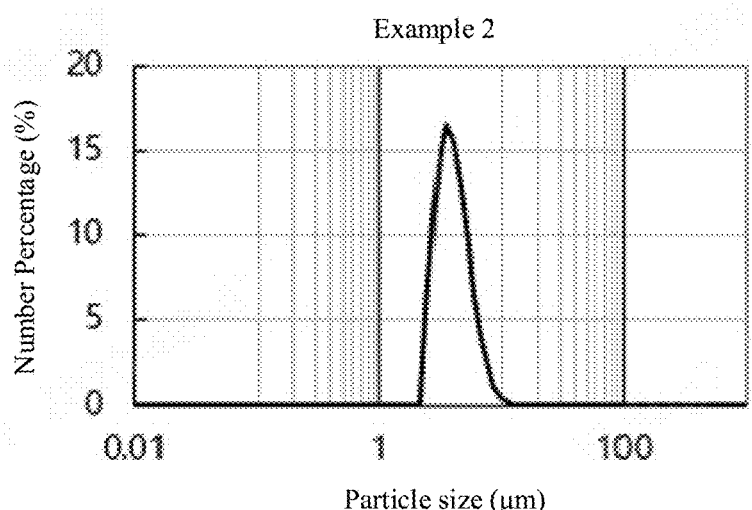
FIG. 2 is a number distribution diagram of particle sizes of a silicon-based material in Example 2 of this application.
Figure 3:
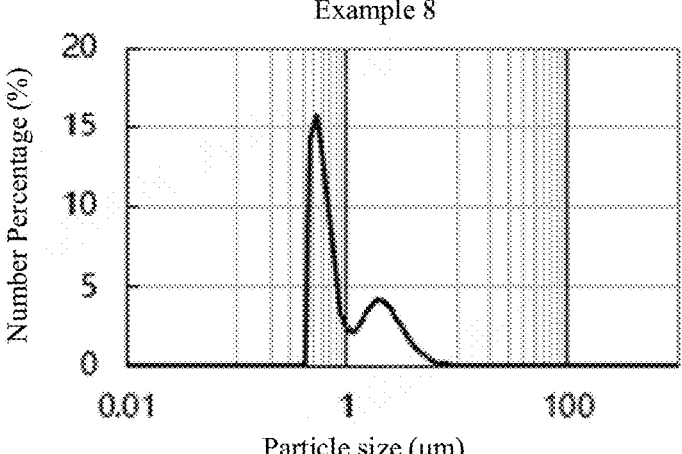
FIG. 3 is a number distribution diagram of particle sizes of a silicon-based material in Example 8 of this application.

Performance test data of each Example is shown in Table 1. FIG. 2 and FIG. 3 are number distribution diagrams of particle sizes of the negative electrode materials of Example 2 and Example 8 respectively. From comparison of the test data of Examples 1 to 8, it can be learned that Example 8 had a higher swelling rate after 400 cycles at 45° C. than Examples 1 to 7, and a lower compacted density than Examples 1 to 7. This was because $D_n10$ and $D_n50$ in Example 8 were relatively small, both less than 1 µm, and a value of $(D_n99-D_n10)/D_n50$ was as large as 7.11. In this case, particles with smaller particle sizes in the negative electrode material accounted for a large proportion in number distribution, while particles with larger particle size accounted for a small proportion in number distribution. This led to a decreased bulk density and compacted density of the negative electrode material. In addition, the presence of the particles with smaller particle sizes might cause more violent reactions with an electrolyte during electrochemical reactions, and more byproducts were generated, increasing production of gas during cycling, causing the loss of lithium sources and a continuous increase in the SEI film, and degrading cycling performance.

Figure 4:
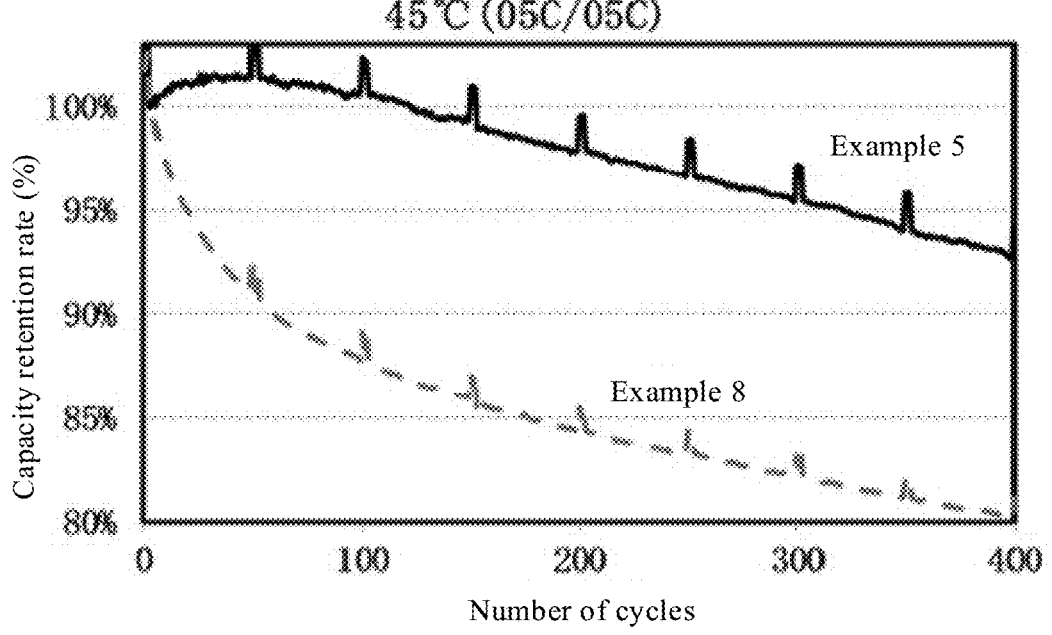
FIG. 4 is a diagram showing cycling capacity retentions of lithium-ion batteries in Example 5 and Example 8 of this application.

FIG. 4 shows the variation of the cycling capacity retention rates in Examples 5 and 8 with the number of cycles. From comparison of Examples 1 and 5, it can be learned that when $D_n10>1$ µm, $1<(D_n99-D_n10)/D_n50<4$ and $D_n50>3$ µm, with the increase of $(D_n99-D_n10)/D_n50$, a compacted density gradually increased, the capacity retention rate after 400 cycles at 45° C. gradually increased, and the swelling rate after 400 cycles at 45° C. gradually decreased. This was because within the specified particle size range, a number distribution of particle sizes of negative electrode materials was even, facilitating the filling of voids and the accumulation of particles, thereby increasing the compacted density, improving the cycling performance and reducing production of gas during cycling.

From comparisons between Examples 5, 6, 7, 9, and 10, it can be learned that with the temperature rise of the CVD furnace, the capacity retention rate after 400 cycles at 45° C. first increased and then decreased, and the swelling rate after 400 cycles at 45° C. first decreased and then increased. Example 5 had the highest capacity retention rate after 400 cycles at 45° C. and the lowest swelling rate after 400 cycles at 45° C. This was because when the CVD temperature was less than 900° C., gas carbonization was incomplete, and the carbon layer was not fully formed; silicon oxide particles had more surface defects, resulting in more byproducts and decreased cycling capacity retention rate. With the temperature increase of the CVD furnace, the particle size of the negative electrode material gradually increased, deficiencies were reduced, and the carbon layer started to form on a surface of a silicon oxide compound. The presence of the carbon layer helped inhibit the swelling of silicon oxide compounds and increase conductivity during cycling. When the temperature of the CVD furnace was too high, the silicon oxide compounds were crystallized significantly, and the ability of the carbon layers to inhibit the silicon oxide compounds was weakened. Therefore, the silicon oxide compounds swell sharply during cycling.

From comparison between Examples 5 and 11, it can be learned that when the particles with larger particle sizes in the negative electrode material accounted for a larger portion in number distribution, accumulation of the particles of the negative electrode material had a poor matching, and the powder compacted density was low. In addition, the presence of the large particles increased local swelling, finally resulting in the loss of electrical contact between active substances in the negative electrode plates, and causing the cycling capacity retention rate to reduce and the cycle swelling rate to increase.

Figure 5:
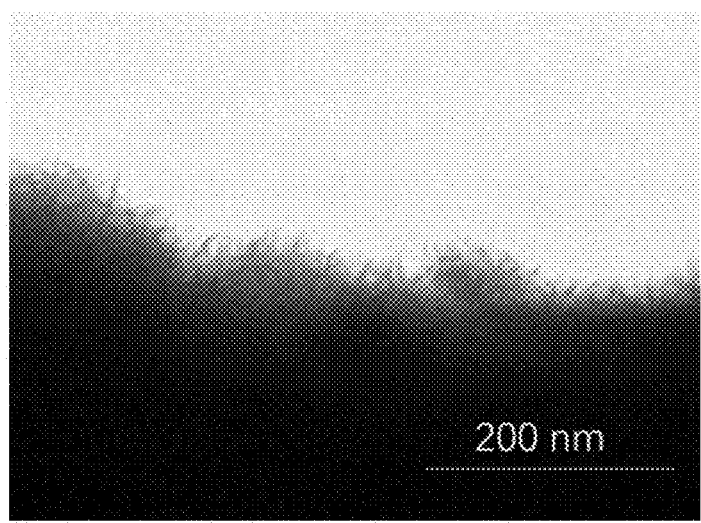
FIG. 5 is a TEM diagram of a carbon layer in Example 5 of this application.
Figure 6:
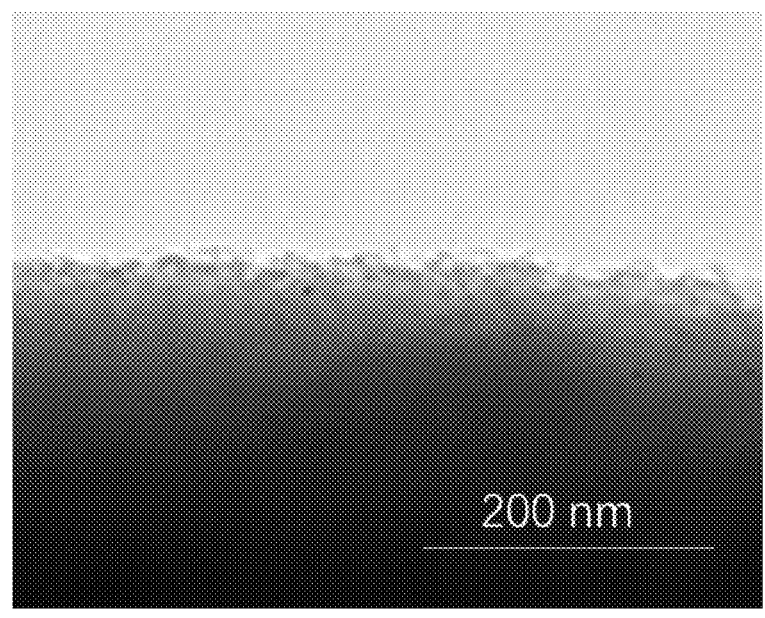
FIG. 6 is a TEM diagram of a carbon layer in Example 12 of this application.

FIG. 5 shows a TEM image of the carbon layer of the negative electrode material in Example 5. FIG. 6 shows a TEM image of the carbon layer of the negative electrode material in Example 12. It can be learned from FIG. 5 and FIG. 6 that the carbon layer in Example 5 was of a velvet structure, while the carbon layer in Example 12 was of a non-velvet compact structure. From comparison between the data of Examples 5 and 12, it can be learned that Example 5 with the carbon layer of a velvet structure had a higher capacity retention rate after 400 cycles at 45° C. than Example 12 with the carbon layer of a non-velvet structure. This was because the carbon layer of a velvet structure had a long-range conduction effect, which was more conducive to electrical contact during cycling and to capacity retention.

From comparison between Examples 5, 13 and 14, it can be learned that with the increase of FEC contained in the electrolyte, the capacity retention rate of the lithium-ion battery after 400 cycles at 45° C. first increased and then decreased, and the swelling rate after 400 cycles at 45° C. first decreased and then increased. When a mass percentage of FEC in the electrolyte for the lithium-ion battery was 3% to 25%, volume swelling during cycling could be significantly reduced and the cycling capacity retention rate could be significantly increased. This was because FEC could improve mechanical properties of SEI films. Therefore, volume swelling during cycling could be effectively reduced. However, too much FEC might cause continuous formation of SEI films, increasing charge transfer impedance at an interface, leading to excessively increased impedance of the lithium-ion battery, and increasing capacity fading at the end of the cycle.

In summary, the number distribution of particle sizes of a negative electrode material containing a silicon-based material can be controlled to satisfy $D_n10>1$ μm, $1<(D_n99-D_n10)/D_n50<4$, and $D_n50>3$ μm. In this way, a powder compacted density of the negative electrode material can be increased, thereby improving cycling performance and reducing volume swelling during cycling.

Although the subject matter has been described in a language specific to structural features and/or logical actions of a method, it should be understood that the subject matter defined in the appended claims is not necessarily limited to the specific features or actions described above. Rather, the specific features and actions described above are merely exemplary forms for implementing the claims.

What is claimed is:

1. An electrochemical apparatus, comprising:

a negative electrode material, comprising:

a silicon-based material; wherein the silicon-based material comprises a silicon oxide material and a carbon layer located on a surface of the silicon oxide material; and a particle size distribution of the silicon-based material satisfies $1\leq(D_n99-D_n10)/D_n50\leq2.02$, $D_n10\geq1$ μm, $D_n50\geq3$ μm, and $6.2$ μm$\leq D_n99\leq12.3$ μm, wherein $D_n10$, $D_n50$ and $D_n99$ are particle sizes when a cumulative number of particles calculated in ascending order of particle sizes reaches 10%, 50%, and 99% of the total number of particles, respectively, in a number distribution diagram of particle sizes of the silicon-based material;

wherein the electrochemical apparatus further comprises an electrolyte, wherein the electrolyte comprises an organic solvent and a lithium salt, and the organic solvent comprises fluoroethylene carbonate (FEC), wherein a mass percentage of FEC in the electrolyte is from 3% to less than 10%.

2. The electrochemical apparatus according to claim 1, wherein the negative electrode material further comprises graphite.

3. The electrochemical apparatus according to claim 2, wherein a mass of the silicon-based material accounts for 5% to 100% of a total mass of the silicon-based material and the graphite.

4. The electrochemical apparatus according to claim 2, wherein the graphite comprises at least one of natural graphite, artificial graphite, or meso-carbon microbeads.

5. The electrochemical apparatus according to claim 1, wherein the silicon oxide material comprises SiOx, wherein x satisfies $0.5<x<1.6$; and SiOx comprises at least one of a crystal state or an amorphous state.

6. The electrochemical apparatus according to claim 1, wherein in a Raman spectrum of the carbon layer, a ratio of a peak intensity at 1350 cm$^{-1}$ $I_{1350}$ to a peak intensity at 1580 cm$^{-1}$ $I_{1580}$ satisfies $1.0<I_{1350}/I_{1580}<2.5$.

7. The electrochemical apparatus according to claim 1, wherein the carbon layer is a velvet structure with a length of 20 nm to 50 nm.

8. An electrochemical apparatus, comprising:

a positive electrode plate, a negative electrode plate, and a separator disposed between the positive electrode plate and the negative electrode plate; wherein the negative electrode plate comprises a negative electrode current collector and a negative electrode active substance layer disposed on the negative electrode current collector, wherein the negative electrode active substance layer comprises a negative electrode material, wherein the negative electrode material comprises a silicon-based material, wherein the silicon-based material comprises a silicon oxide material and a carbon layer located on a surface of the silicon oxide material; and a particle size distribution of the silicon-based material satisfies $1 \leq (D_n99 - D_n10)/D_n50 \leq 2.02$, $D_n10 \geq 1$ $\mu m$, $D_n50 \geq 3$ $\mu m$, and $6.2$ $\mu m \leq D_n99 \leq 12.3$ $\mu m$, wherein $D_n10$, $D_n50$ and $D_n99$ are particle sizes when a cumulative number of particles calculated in ascending order of particle sizes reaches 10%, 50%, and 99% of the total number of particles, respectively, in a number distribution diagram of particle sizes of the silicon-based material;

wherein the electrochemical apparatus further comprises an electrolyte, wherein the electrolyte comprises an organic solvent and a lithium salt, and the organic solvent comprises fluoroethylene carbonate (FEC), wherein a mass percentage of FEC in the electrolyte is from 3% to less than 10%.

9. The electrochemical apparatus according to claim 8, wherein the negative electrode material further comprises graphite.

10. The electrochemical apparatus according to claim 9, wherein a mass of the silicon-based material accounts for 5% to 100% of a total mass of the silicon-based material and the graphite.

11. The electrochemical apparatus according to claim 9, wherein the graphite comprises at least one of natural graphite, artificial graphite, or meso-carbon microbeads.

12. The electrochemical apparatus according to claim 8, wherein in a Raman spectrum of the carbon layer, a ratio of a peak intensity at 1350 $cm^{-1}$ $I_{1350}$ to a peak intensity at 1580 $cm^{-1}$ $I_{1580}$ satisfies $1.0 < I_{1350}/I_{1580} < 2.5$.

13. The electrochemical apparatus according to claim 8, wherein the carbon layer is a velvet structure with a length of 20 nm to 50 nm.

14. The electrochemical apparatus according to claim 8, wherein the negative electrode active substance layer comprises a binder, wherein the binder comprises at least one of polyacrylate, polyimide, polyamide, polyamideimide, polyfluoroethylene, styrene butadiene rubber, sodium alginate, polyvinyl alcohol, polytetrafluoroethylene, polyacrylonitrile, sodium carboxymethyl cellulose, potassium carboxymethyl cellulose, sodium hydroxymethyl cellulose, or potassium hydroxymethyl cellulose.

15. The electrochemical apparatus according to claim 8, wherein the organic solvent further comprises at least one of ethylene carbonate (EC), propylene carbonate (PC), diethyl carbonate (DEC), ethyl methyl carbonate (EMC), dimethyl carbonate (DMC), polypropylene carbonate, or ethyl propionate.

16. An electronic apparatus, comprising the electrochemical apparatus according to claim 8.

* * * * *